United States Patent
Hadrick

(10) Patent No.: US 12,437,789 B2
(45) Date of Patent: Oct. 7, 2025

(54) APPARATUS WITH TIMING CONTROL FOR A DIE GROUPING

(71) Applicant: Micron Technology, Inc., Boise, ID (US)

(72) Inventor: Mark K. Hadrick, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 438 days.

(21) Appl. No.: 17/868,695

(22) Filed: Jul. 19, 2022

(65) Prior Publication Data

US 2024/0029767 A1    Jan. 25, 2024

(51) Int. Cl.
*G11C 5/06* (2006.01)
*G11C 7/10* (2006.01)
*G11C 7/04* (2006.01)

(52) U.S. Cl.
CPC .......... *G11C 7/1093* (2013.01); *G11C 7/1084* (2013.01); *G11C 7/1087* (2013.01); *G11C 7/1096* (2013.01)

(58) Field of Classification Search
CPC ... G11C 7/1093; G11C 7/1084; G11C 7/1087; G11C 7/1096; G11C 8/18; G11C 5/04; G11C 5/063
USPC ........................................................ 365/233.1
See application file for complete search history.

(56) References Cited

U.S. PATENT DOCUMENTS

| | | | |
|---|---|---|---|
| 11,081,468 B2 | 8/2021 | Fujisawa et al. | |
| 11,232,830 B1* | 1/2022 | Mazumder | .......... G11C 11/4087 |
| 2021/0141748 A1* | 5/2021 | Ware | ....................... G11C 7/106 |

* cited by examiner

*Primary Examiner* — Alexander Sofocleous
*Assistant Examiner* — James S Wells
(74) *Attorney, Agent, or Firm* — Dorsey & Whitney LLP

(57) ABSTRACT

Methods, apparatuses, and systems related to die-to-die communications are described. An apparatus may include a master die and a slave die communicatively coupled to each other through an internal bus. The apparatus can be configured to use an internal command and/or a data clock to coordinate the storage/write operation at the slave die instead of or in addition to a command address clock.

11 Claims, 6 Drawing Sheets

APPARATUS WITH TIMING CONTROL FOR A DIE GROUPING

TECHNICAL FIELD

The disclosed embodiments relate to devices, and, in particular, to semiconductor memory devices with timing control of array events.

BACKGROUND

An apparatus (e.g., a processor, a memory system, and/or other electronic apparatus) can include one or more semiconductor circuits configured to store and/or process information. For example, the apparatus can include a memory device, such as a volatile memory device, a non-volatile memory device, or a combination device. Memory devices, such as dynamic random-access memory (DRAM), utilize electro-magnetic energy to store and access data.

Technological improvements are often associated with decreasing the size/footprint of the apparatus and/or circuits therein. Accordingly, the apparatus can include denser circuits and/or stacked semiconductor devices. However, decreasing the size/footprint and/or stacking semiconductor devices present new or additional challenges. For example, memory devices operate with relatively short durations for signal transitions, which are becoming even shorter in efforts to increase operating speeds. Further compounding the problems, as the density of the circuits increase, separations between signal connections (e.g., wires, traces, contacts, etc.) decrease. The decrease in physical separation increases capacitances and/or inductances between connections and/or corresponding circuits, thereby delaying or prolonging the transitions between signal levels. Further, when functionalities/capacities of the devices are increased via additional circuits (by, e.g., stacking or chaining multiple dies or circuits), propagation delays are introduced or increased for inter-die signals due to the lengthened signal paths. Different amounts of propagation delays are introduced to signals traveling different lengths to reach different dies within the stack. As such, signal timings must account for the varying propagation delays, which often present added difficulties in reducing the signal transition windows.

DETAILED DESCRIPTION

Figure 1:
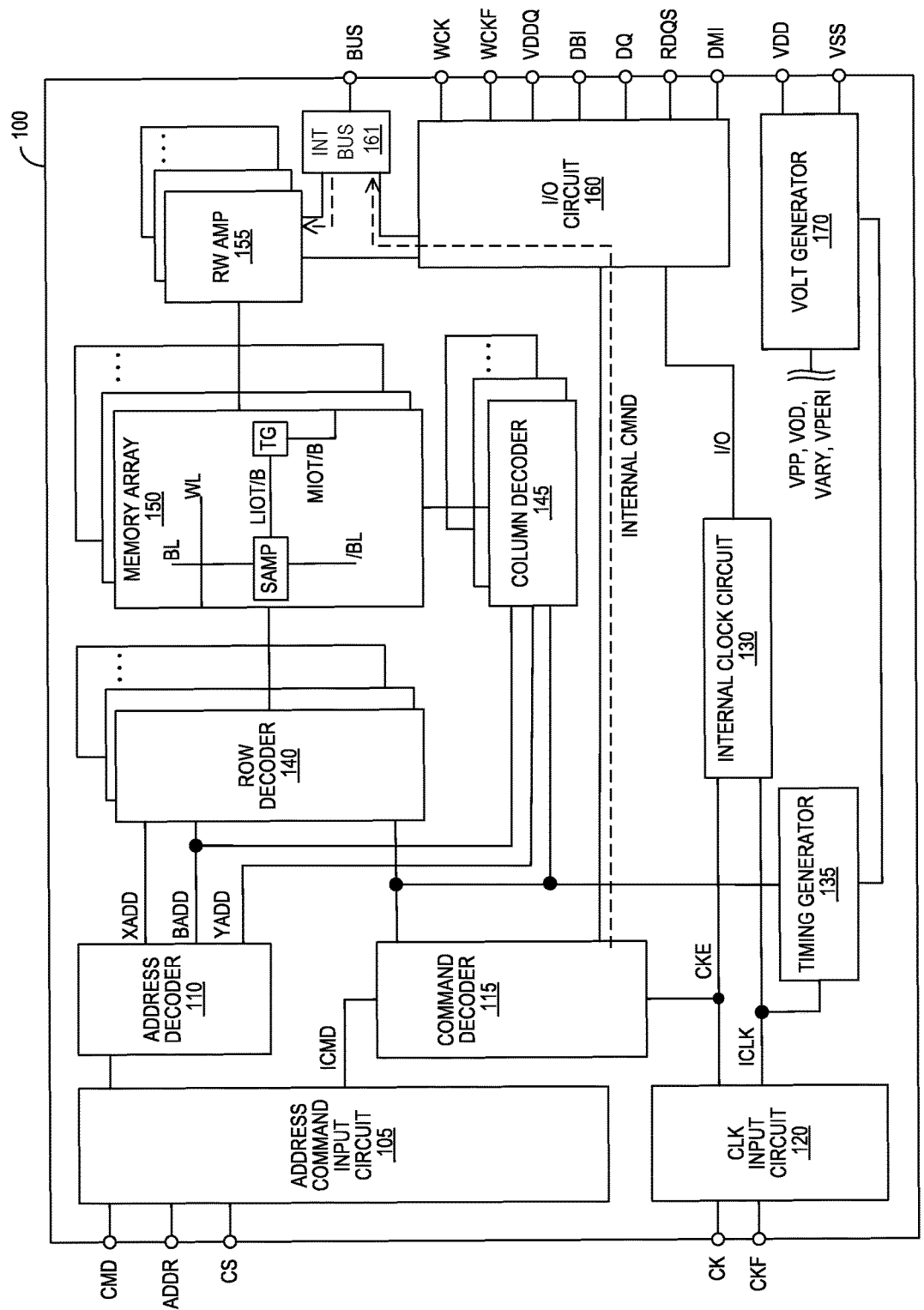
FIG. 1 is a block diagram of an apparatus in accordance with an embodiment of the present technology.

As described in greater detail below, the technology disclosed herein relates to an apparatus, such as for memory systems, systems with memory devices, related methods, etc., for controlling timing of array events. The apparatus (e.g., a memory device and/or a system including the memory device) can include a die grouping (e.g., a die stack or a side-by-side arrangement) that includes a master die along with a slave die or a set of slave dies. The master die can function as an interface to an external device (e.g., a host device) such that the external device views the die grouping as a single device (e.g., without seeing the individual dies). Accordingly, the master die can include an interface circuit (e.g., a combination of an externally-oriented circuitry and an internally-oriented circuitry) that processes and/or translates operations and/or information across external and internal formats. In some embodiments, the master die and the slave dies can have matching circuits that are selectively/differently activated and disengaged to implement the different operations and roles for the dies. Each die can have command address pads and a command-address clock (CA Clock). The master die can have an active set of DQ pads and data clock (e.g., WCK clock) that directly communicate with external devices while the slave die can have an inactive set of data clock and DQ pads.

During a write operation, the master die and slave die can receive the write command and column address via their individual and active command address pads. The write command and the column address bits can arrive on the command address pins aligned with the CA clock, and the write data bits can arrive on the DQ pads aligned with the data clock. Data for both dies are provided through the master die DQ pads. In some embodiments, the master die sends a portion (e.g., half) of the write data bits to the slave die array and stores another portion (e.g., remaining half for two-die configuration) of the write data bits to the local array. The master die can use the linked data pads connecting the master die and the slave die to communicate the portion of the write data bits to the slave die. However, since the die-to-die connections are typically longer than the local connections within a die, the die-to-die path can introduce a delay at the slave die for the write data relative to the write command, which can be received directly from the host. For example, a misalignment occurs on the slave die since the write command bits are received on the CA pins in alignment with the CA clock while the write data bits are received in alignment with the data clock.

To reduce the misalignment and/or to increase the tolerance for ensuring the overlap in the signals, the apparatus can be configured to use the data clock in the master die DQ logic to coordinate the storage/write operation at the slave die instead of or in addition to the CA clock. Since the data clock inherently has the same timing as the write data, the master die can effectively eliminate the negative effects of propagation delay and the separate coordination signals. By using signals derived from the data clock to control the arrival of the write command data at the slave memory array, the write command and write data can be aligned, thus reducing or eliminating the misalignment that can occur in the linked-die architecture.

FIG. 1 is a block diagram of an apparatus 100 (e.g., a semiconductor die assembly, including a three-dimensional integration (3DI) device, a die-stacked package, and/or a laterally-linked circuits) in accordance with an embodiment of the present technology. For example, the apparatus 100 can include one or more DRAMs or a portion thereof.

The apparatus 100 may include an array of memory cells, such as memory array 150. The memory array 150 may include a plurality of banks (e.g., banks 0-15), and each bank may include a plurality of word-lines (WL), a plurality of bit lines (BL), and a plurality of memory cells arranged at intersections of the word-lines and the bit lines. Memory cells can include any one of a number of different memory media types, including capacitive, magnetoresistive, ferroelectric, phase change, or the like. The selection of a word-line WL may be performed by a row decoder 140, and the selection of a bit line BL may be performed by a column decoder 145. Sense amplifiers (SAMP) may be provided for corresponding bit lines BL and connected to at least one respective local I/O line pair (LIOT/B), which may in turn be coupled to at least respective one main I/O line pair (MIOT/B), via transfer gates (TG), which can function as switches. The sense amplifiers and transfer gates may be operated based on control signals from decoder circuitry, which may include the command decoder 115, the row decoders 140, the column decoders 145, any control circuitry of the memory array 150, or any combination thereof. The memory array 150 may also include plate lines and corresponding circuitry for managing their operation.

The apparatus 100 may employ a plurality of external terminals that include command and address terminals coupled to a command bus and an address bus to receive command signals (CMD) and address signals (ADDR), respectively. The apparatus 100 may further include a chip select terminal to receive a chip select signal (CS), clock terminals to receive clock signals CK and CKF, data clock terminals to receive data clock signals WCK and WCKF, data terminals DQ, RDQS, DBI, and DMI, power supply terminals VDD, VSS, and VDDQ.

The command terminals and address terminals may be supplied with an address signal and a bank address signal (not shown in FIG. 1) from outside. The address signal and the bank address signal supplied to the address terminals can be transferred, via a command/address input circuit 105, to an address decoder 110. The address decoder 110 can receive the address signals and supply a decoded row address signal (XADD) to the row decoder 140, and a decoded column address signal (YADD) to the column decoder 145. The address decoder 110 can also receive the bank address signal and supply the bank address signal to both the row decoder 140 and the column decoder 145.

The command and address terminals may be supplied with command signals (CMD), address signals (ADDR), and chip select signals (CS), from a memory controller. The command signals may represent various memory commands from the memory controller (e.g., including access commands, which can include read commands and write commands). The chip select signal may be used to select the apparatus 100 to respond to commands and addresses provided to the command and address terminals. When an active chip select signal is provided to the apparatus 100, the commands and addresses can be decoded, and memory operations can be performed. The command signals may be provided as internal command signals ICMD to a command decoder 115 via the command/address input circuit 105. The command decoder 115 may include circuits to decode the internal command signals ICMD to generate various internal signals and commands for performing memory operations, for example, a row command signal to select a word-line and a column command signal to select a bit line. The command decoder 115 may further include one or more registers for tracking various counts or values (e.g., counts of refresh commands received by the apparatus 100 or self-refresh operations performed by the apparatus 100).

Read data can be read from memory cells in the memory array 150 designated by row address (e.g., address provided with an active command) and column address (e.g., address provided with the read). The read command may be received by the command decoder 115, which can provide internal commands to input/output (I/O) circuit 160 so that read data can be output from the data terminals DQ, RDQS, DBI, and DMI via read/write amplifiers 155 and the I/O circuit 160 according to the RDQS clock signals. The read data may be provided at a time defined by read latency information RL that can be programmed in the apparatus 100, for example, in a mode register (not shown in FIG. 1). The read latency information RL can be defined in terms of clock cycles of the CK clock signal. For example, the read latency information RL can be a number of clock cycles of the CK signal after the read command is received by the apparatus 100 when the associated read data is provided.

In some embodiments, the write data can be supplied by a host to the data terminals DQ, DBI, and DMI according to the WCK and WCKF clock signals. The write command may be received by the command decoder 115, which can provide internal commands to the I/O circuit 160 so that the write data can be received by data receivers in the I/O circuit 160 and supplied via the I/O circuit 160 and the read/write amplifiers 155 to the memory array 150. The write data may be written in the memory cell designated by the row address and the column address. The write data may be provided to the data terminals at a time that is defined by write latency WL information. The write latency WL information can be programmed in the apparatus 100, for example, in the mode register. The write latency WL information can be defined in terms of clock cycles of the CK clock signal. For example, the write latency information WL can be a number of clock cycles of the CK signal after the write command is received by the apparatus 100 when the associated write data is received.

When multiple instances of the apparatus 100 are linked, such as in master-slave configurations, the apparatus 100 can include an inter-die bus interface 161 configured to communicate information between the dies. Using a write operation as an illustrative example, the apparatus 100 configured as a master die can receive the externally provided write data and the coordination signals (e.g., WCK and WCKF). The master die and the slave die can use a die-to-die connection and the corresponding inter-die bus interfaces 161 to communicate the write data or a portion thereof from the master die to the slave die. Accordingly, the grouped apparatus can store a portion of the write data in the master die and a different portion(s) of the write data in the slave die(s). In some embodiments, the master die and/or the slave die can use internally generated write commands to coordinate the write operation at the slave die. In other words, the master die can send the internal write command (e.g., aligned with the data clock) using the bus interface 161. The slave die can receive the internal write command and use it to coordinate storage of the write data into the memory array 150 local to the slave die. The slave die can use the data clock in the master die DQ logic to coordinate the storage/write operation at the slave die instead of or in addition to the CA clock. The slave die can leverage the data clock instead of the externally provided write command and/or the WCK/WCKF received locally or directly at the slave die. Details regarding the die-to-die coordination are described below.

The power supply terminals may be supplied with power supply potentials $V_{DD}$ and $V_{SS}$. These power supply potentials $V_{DD}$ and $V_{SS}$ can be supplied to an internal voltage generator circuit 170. The internal voltage generator circuit 170 can generate various internal potentials $V_{PP}$, $V_{OD}$, $V_{ARY}$, $V_{PERI}$, and the like based on the power supply potentials $V_{DD}$ and $V_{SS}$. The internal potential $V_{PP}$ can be used in the row decoder 140, the internal potentials $V_{OD}$ and $V_{ARY}$ can be used in the sense amplifiers included in the memory array 150, and the internal potential $V_{PERI}$ can be used in many other circuit blocks.

The power supply terminal may also be supplied with power supply potential $V_{DDQ}$. The power supply potential $V_{DDQ}$ can be supplied to the I/O circuit 160 together with the power supply potential $V_{SS}$. The power supply potential $V_{DDQ}$ can be the same potential as the power supply potential $V_{SS}$ in an embodiment of the present technology. The power supply potential $V_{DDQ}$ can be a different potential from the power supply potential $V_{DD}$ in another embodiment of the present technology. However, the dedicated power supply potential $V_{DDQ}$ can be used for the I/O circuit 160 so that power supply noise generated by the I/O circuit 160 does not propagate to the other circuit blocks.

The clock terminals and data clock terminals may be supplied with external clock signals and complementary external clock signals. The external clock signals CK, CKF, WCK, WCKF can be supplied to a clock input circuit 120. The CK and CKF signals can be complementary, and the WCK and WCKF signals can also be complementary. Complementary clock signals can have opposite clock levels and transition between the opposite clock levels at the same time. For example, when a clock signal is at a low clock level a complementary clock signal is at a high level, and when the clock signal is at a high clock level the complementary clock signal is at a low clock level. Moreover, when the clock signal transitions from the low clock level to the high clock level the complementary clock signal transitions from the high clock level to the low clock level, and when the clock signal transitions from the high clock level to the low clock level the complementary clock signal transitions from the low clock level to the high clock level.

Input buffers included in the clock input circuit 120 can receive the external clock signals. For example, when enabled by a clock/enable signal from the command decoder 115, an input buffer can receive the clock/enable signals. The clock input circuit 120 can receive the external clock signals to generate internal clock signals ICLK. The internal clock signals ICLK can be supplied to an internal clock circuit 130. The internal clock circuit 130 can provide various phase and frequency controlled internal clock signals based on the received internal clock signals ICLK and a clock enable (not shown in FIG. 1) from the command/address input circuit 105. For example, the internal clock circuit 130 can include a clock path (not shown in FIG. 1) that receives the internal clock signal ICLK and provides various clock signals to the command decoder 115. The internal clock circuit 130 can further provide I/O clock signals. The I/O clock signals can be supplied to the input/output circuit 160 and can be used as timing signals for determining output timing of read data and/or input timing of write data. The I/O clock signals can be provided at multiple clock frequencies so that data can be output from and input to the apparatus 100 at different data rates. A higher clock frequency may be desirable when high memory speed is desired. A lower clock frequency may be desirable when lower power consumption is desired. The internal clock signals ICLK can also be supplied to a timing generator 135 and thus various internal clock signals can be generated.

The apparatus 100 can be connected to any one of a number of electronic devices capable of utilizing memory for the temporary or persistent storage of information, or a component thereof. For example, a host device of apparatus 100 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device may be a networking device (e.g., a switch, a router, etc.) or a recorder of digital images, audio and/or video, a vehicle, an appliance, a toy, or any one of a number of other products. In one embodiment, the host device may be connected directly to apparatus 100; although in other embodiments, the host device may be indirectly connected to memory device (e.g., over a networked connection or through intermediary devices).

Figure 2:
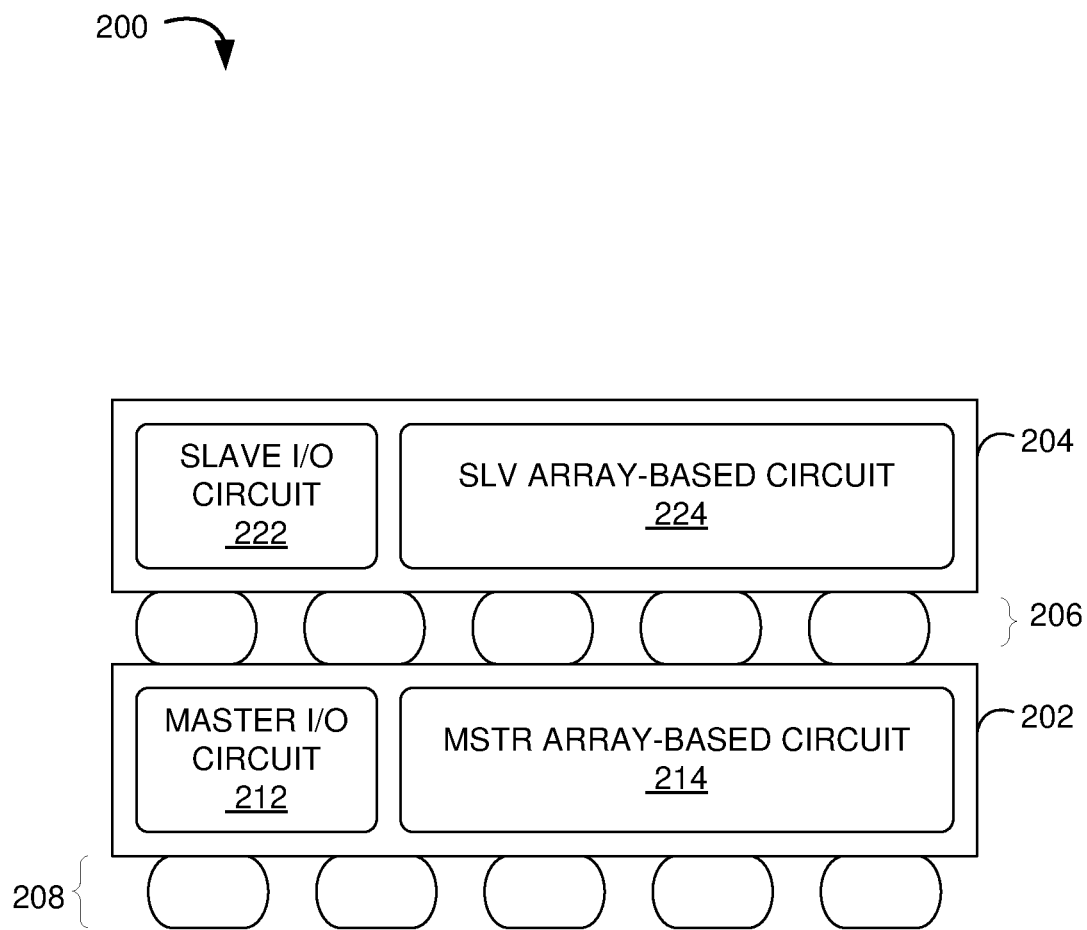
FIG. 2 is a schematic diagram of a die stack in accordance with an embodiment of the present technology.

FIG. 2 is a schematic diagram of a die grouping 200 (e.g., a stack or a side-by-side configuration) in accordance with an embodiment of the present technology. In some embodiments, the apparatus 100 of FIG. 1 can correspond to the die grouping 200 and/or portion(s) thereof. For example, the die grouping 200 can have two or more stacked or grouped DRAM dies (e.g., instances of the apparatus 100), such as a master die 202 with a slave die 204 stacked or attached on top. In other embodiments, the master die 202 and the slave die 204 can be attached side-by-side or adjacent to each other on a common board/substrate. The grouped dies can be electrically coupled to each other through die-to-die connectors 206 (e.g., wirebonds, Through-Silicon-Vias (TSVs), die-to-die connectors, columns solder, etc.). The die-to-die connectors 206 can contact and/or be coupled to electrical connectors on the dies, such as traces, pads, TSVs, wires, and/or circuit elements (e.g., passive devices and/or transistor devices). The die grouping 200 can include a set of external connectors 208 (e.g., pads, solder bumps, and/or other connectors) configured to electrically couple the die grouping 200 to an external device, circuit, and/or structure. The external connectors 208 can be directly attached to or integral with the master die 202.

One or more of the die-to-die connectors 206 can be included in and/or facilitate a grouping-internal or inter-die bus (e.g., the internal bus interface 161 of FIG. 1) that connects the dies within the grouping 200 to each other. The inter-die bus can be used to communicate various types of information (via, e.g., dedicated connections and/or shared-multiplexed connections), such as data, timing/strobe signals, clock signals, command signals, etc. Some examples of the information communicated over the inter-die bus can include read or write data, strobes, and/or clocks.

Each of the dies can include data storage circuits and interface circuits. For example, the master die 202 can include a master interface (e.g., I/O) circuit 212 and the master array-based circuit 214. Each of the slave dies 204 can include a slave interface (I/O) circuit 222 and a slave array-based circuit 224.

The master I/O circuit 212 can include circuitry configured to communicate information with the external device (e.g., a host device or a controller) and the slave dies 204. For example, the master I/O circuit 212 can include internal and external connections (e.g., pads) that are connected to the die-to-die connectors 206 and external connectors 208, respectively. The master I/O circuit 212 can include circuitry configured to translate (via, e.g., a look up table) between externally-used addresses (e.g., addresses used by the host device to identify locations within the die grouping) and internally-used addresses (e.g., addresses to identify targeted dies and/or locations within the targeted dies). In other words, the external devices can essentially view (via, e.g., the externally-used addressing mechanism) the die grouping 200 as a single device without distinguishing between the individual dies therein. The master I/O circuit 212 can be configured to route the data to/from the dies within the die grouping 200 according to the translation.

As an illustrative example, the master I/O circuit 212 can include at least a portion of the address command input circuit 105 of FIG. 1 and be configured to receive a physical address along with a read command from the host device. The master I/O circuit 212 can be configured to identify a die, a channel, a bank, etc. based on the physical address. The master I/O circuit 212 can include circuitry to communicate the read command and the translated storage location accordingly. The master I/O circuit 212 can further include at least a portion of the I/O circuit 160 of FIG. 1 and the corresponding pads configured to receive the read data from the storage locations and communicate the read data out to the host device. The master I/O circuit 212 can include one or more portions of other circuits illustrated in FIG. 1, such as the clock input circuit 120, the timing generator 135, the internal clock circuit 130, etc.

When the die targeted by the commanded/scheduled operation is the master die 202, the master die can access the corresponding location in the master array-based circuit 214. The master array-based circuit 214 can include local memory cells (e.g., a portion of the memory array 150 of FIG. 1) configured to store data on the master die 202. The master array-based circuit 214 can further include array-related circuitry (e.g., a portion of the row/column decoders, the read/write amplifiers 155, etc. illustrated in FIG. 1) configured to store data into and read data from the local memory cells.

When the die targeted by the commanded/scheduled operation is a slave die, the master I/O circuit 212 can communicate the command and/or the location to the slave I/O circuit 222 of the targeted slave die. The slave I/O circuit 222 can include circuitry configured to communicate information with the master die 202. The slave I/O circuit 222 can communicate to the external device through the master I/O circuit 212 (i.e., without a direct access to the external device). For example, the slave I/O circuit 222 can include internal connections (e.g., pads) that are connected to the die-to-die connectors 206. The slave I/O circuit 222 can include circuitry configured to access locally stored data. The slave I/O circuit 222 can correspond to internal electrical connections (e.g., connections between circuits), a portion of the address command input circuit 105, a portion of the I/O circuit 160, and/or other circuits shown in FIG. 1.

In a CXL configuration, the apparatus 100 of FIG. 1 can use a linked-die architecture, where a set of (e.g., two) separate DRAM dies (e.g., master die 202 and slave die 204) share the same DQ pads and data clock (WCK clock) despite having individual dedicated (e.g., externally connected) command address pads and CA clock. The set of dies can store different or non-overlapping portions of the incoming write data. Accordingly, the set of dies can effectively provide simultaneous or parallel access and processing of different portions of one unit of data instead of sequentially accessing/processing the one unit of data with one die or a corresponding set of circuits.

For the divided storage/access of the data, a portion (e.g., half) of the write data from the DQ pads can travel from the master die 202 to the slave die 204 through die-to-die connectors 206 (e.g., wire bond links), which can introduce a delay of the write data relative to the slave die write command. At the slave die 204, the external write command and the targeted portion of the write data can arrive or be loaded at different times due at least in part to the delay corresponding to the longer signal path associated with the wire-bond connection. To reduce the delay, the apparatus can be configured to use the data clock in the master die 202 DQ logic to coordinate the storage/write operation at the slave die 204 instead of or in addition to the CA clock. Since the data clock inherently has the same timing as the write data, the master die 202 can effectively eliminate the negative effects of propagation delay and the separate coordination signals. By using signals derived from the data clock to control the arrival of the write command data at the memory array of the slave die 204, the write command and write data are naturally aligned, thus eliminating the misalignment that can occur in the linked-die architecture.

The slave array-based circuit 224 can be similar to the master array-based circuit 214. For example, the slave array-based circuit 224 can include local memory cells (e.g., a portion of the memory array 150) configured to store data on the corresponding slave die. The slave array-based circuit 224 can further include array-related circuitry (e.g., a portion of the row/column decoders, the read/write amplifiers 155, etc. illustrated in FIG. 1) configured to store data into and read data from the local memory cells.

The die grouping 200 can include the circuitry illustrated in FIG. 1 distributed over the master die 202 and the slave dies 204. In some embodiments, the master die 202 and the slave dies 204 can include identical circuitry/designs that are activated or enabled according to the master/slave roles. For example, the slave dies 204 can include externally-facing communication circuitry, DQ pad and related logic, and/or the translation circuitry that have been disabled. Alternatively, the master die 202 can include a different circuitry/design than the slave dies 204.

Figure 3:
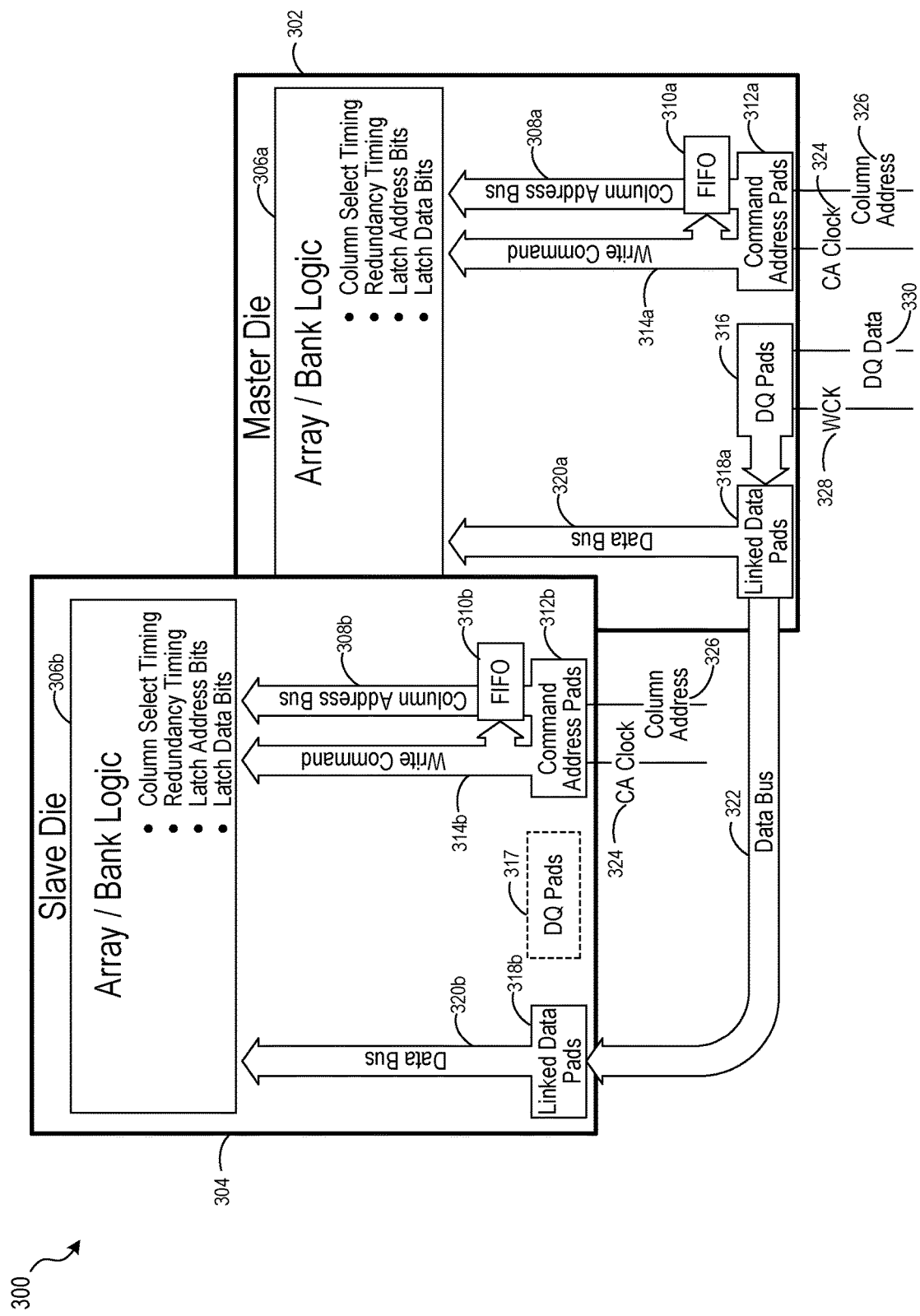
FIG. 3 is a block diagram of a first circuit with a write command and a write data in accordance with an embodiment of the present technology.

FIG. 3 is a block diagram of a first circuit 300 with a write command and a write data in accordance with an embodiment of the present technology. The apparatus 100 of FIG. 1 can include a die grouping (e.g., the die grouping 200 of FIG. 2) that includes a master die 302 and a slave die 304. The master die 302 can function as an interface to an external device (e.g., a host device) such that the external device views the die grouping as a single device (e.g., without seeing, accessing, and/or communicating with the individual dies). Accordingly, the master die 302 can include an interface circuit that processes and/or translates operations and/or information across external and internal formats. The master die 302 can have command address pads 312a receiving inputs of the CA clock 324 and column address 326 from an external device (e.g., host and/or memory controller). The master die 302 can have an active set of DQ pads 316 receiving inputs of WCK clock 328 and DQ data 330 (e.g., write data). The slave die 304 can have command address pads 312b to receive inputs of the CA clock 324 and column address 326 from the external device. The slave die 304 can have an inactive or unconnected set of DQ pads 317.

During a write operation, the master die 302 and slave die 304 can receive the write command and the column address 326 bits on the command address pads 312a and 312b aligned with the CA clock 324. The master die 302 can receive the write data bits (e.g., DQ data 330) on the DQ pads 316 aligned with the WCK clock 328. In some embodiments, the master die 302 sends a portion (e.g., half) of the write data bits to the slave die memory array 306b using an inter-die data bus 322 (e.g., the inter-die bus interface 161 of FIG. 1, the die-to-die connectors of FIG. 2, or a combination thereof) and locally stores another portion (e.g., remaining half for two-die configuration) of the write data bits at the master die.

The master die 302 can store the column address 326 bits in a master First-In First-Out (FIFO) buffer 310a and wait for the write latency and write burst to complete. The master die 302 can create a write command 314a aligned with the CA clock 324 and send the write command 314a to the array/bank logic 306a. The master die 302 can locally send the stored column address bits to the array/bank logic 306a via a master-local column address bus 308a. The master die 302 can send the write data bits, aligned with the WCK clock 328, to the array/bank logic 306a via a master-local data bus 320a. The master die 302 can send the write data bits, the column address bits, and the write command to the array/bank logic 306a to complete the local write operation and locally store a targeted portion of the write data in the correct column location of the array/bank logic 306a. The array/bank logic 306a can control column select timing, redundancy timing, latch address bits, and latch data bits. The CA clock aligned signals determine the write timing in the array/bank logic 306a. The master die 302 can use the CA clock aligned write command 314a to create the column select timing, the column redundancy match timing, and to create the signal that capture both the write address and write data bits in the array/bank logic 306a.

The slave die 304 can store the column address 326 bits in a slave FIFO 310b and wait for the write latency and write burst to complete. The slave die 304 can include logic or circuitry that is configured to generate an internal write command 314b aligned with the CA clock 324 and send the write command 314b to the array/bank logic 306b. The slave die 304 can send the stored column address bits to the array/bank logic 306b via a slave-local column address bus 308b. The slave die 304 receives the write data bits at linked data pads 318b from the linked data pads 318a via the inter-die data bus 322. The slave die 304 sends write data bits, aligned with the WCK clock 328, to the array band logic 306b via a slave-local data bus 320b data. The slave die 304 sends the write data bits, the column address bits, and the write command to the array/bank logic 306b to complete the write operation and locally store the remaining/targeted portion of the write data in the correct column location of the array/bank logic 306b. The array/bank logic 306b can control column select timing, redundancy timing, latch address bits, and latch data bits. The CA clock aligned signals determine the write timing in the array/bank logic 306b. The slave die 304 can use the CA clock aligned write command 314b to create the column select timing, the column redundancy match timing, and to create the signal that capture both the write address and write data bits in the array/bank logic 306b.

In some embodiments, at the slave die 304, the array/bank logic 306b can receive write command 314b and the information on the column address bus 308b before the write data in the inter-die data bus 320b. This misalignment can occur at the slave die 304 because the write data travels through the linked data pad 318b connection before arriving at the array/bank logic 306b. Additional control for accurately latching the write data with the array/bank logic 306b signals is required as there is no equivalent delay in the write command 314b and column address 308b path. In some embodiments, because the write data bits on the slave die 304 are aligned with the WCK clock 328, but the rest of the array/bank logic 306b timing is derived from the CA clock 324, additional logic/circuitry is introduced (at, e.g., the array/bank logic 306) to control the timing that carefully corresponds to or mimics the delay for the command address 312b and data bus 320b paths, thereby reliably latching the write data bits with the array/bank logic 306b signals.

Figure 4:
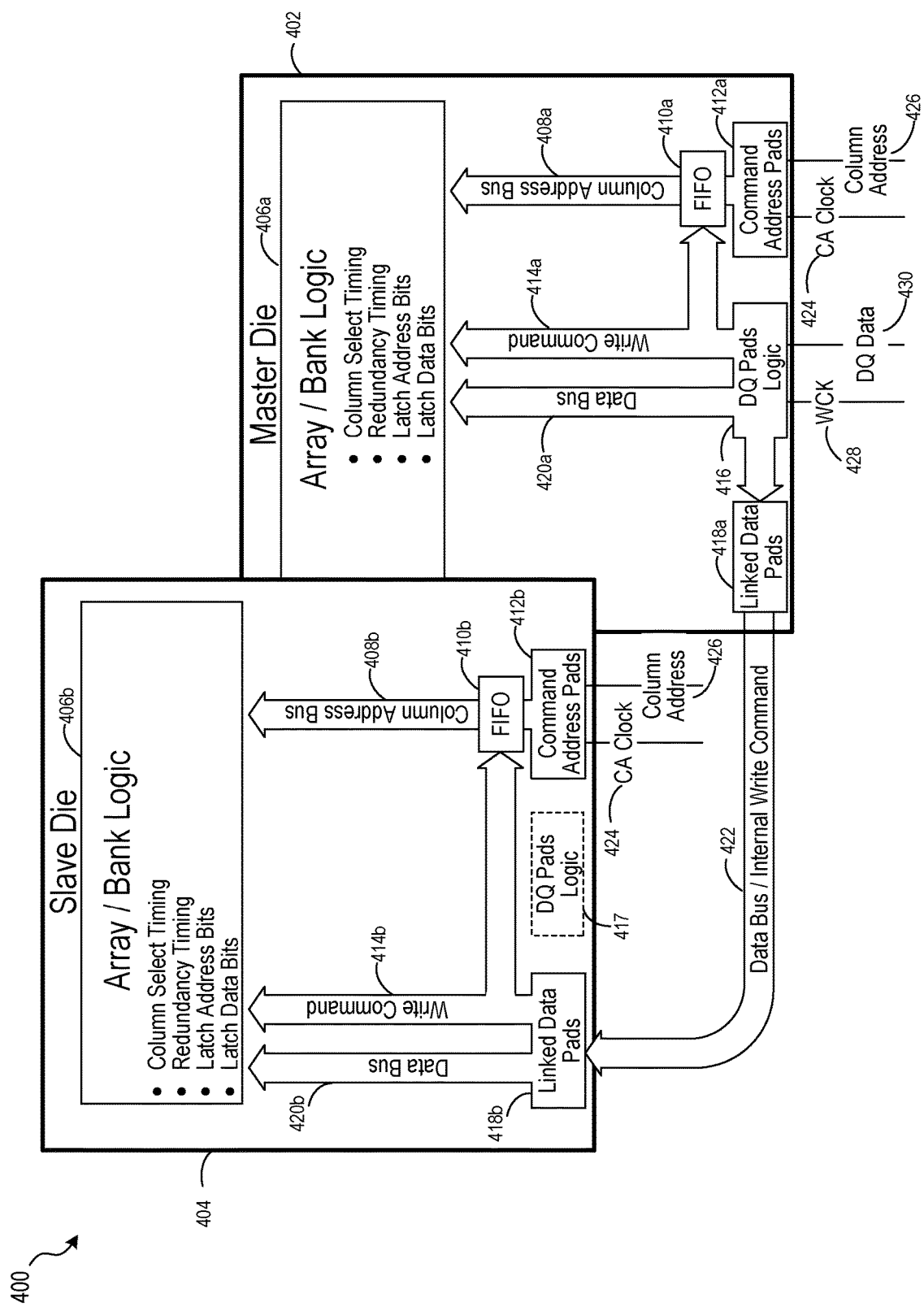
FIG. 4 is a block diagram of a second circuit with a mechanism for aligning a write command and a write data using a data clock in accordance with an embodiment of the present technology.

FIG. 4 is a block diagram of a second circuit 400 with a mechanism for aligning a write command and a write data using a data clock in accordance with an embodiment of the present technology. The apparatus 100 of FIG. 1 can include a die grouping (e.g., the die grouping 200 of FIG. 2) that includes a master die 402 and a slave die 404. The master die 402 can function as an interface to an external device (e.g., a host device) such that the external device views the die grouping as a single device (e.g., without seeing, accessing, and/or communicating with the individual dies). Accordingly, the master die 402 can include an interface circuit that processes and/or translates operations and/or information across external and internal formats. The master die 402 can have command address pads 412a receiving inputs of the CA clock 424 and column address 426 from an external device (e.g., host and/or memory controller). The master die 402 can have an active set of DQ pads 416 receiving inputs of WCK clock 428 and DQ data 430. The slave die 404 can have command address pads 412b receiving inputs of the CA clock 424 and column address 426 from the external device. The slave die 404 can have an inactive or unconnected set of DQ pads 417.

During a write operation, the master die 402 and slave die 404 can receive the write command and the column address 426 bits on the command address pads 412a and 412b aligned with the CA clock 424. The master die 402 can receive the write data bits (e.g., DQ data 430) on the DQ pads 416 aligned with the WCK clock 428. In some embodiments, the master die 402 sends a portion (e.g., half) of the write data bits to the slave die array/bank logic 406b using an inter-die data bus 422 (e.g., the inter-die bus interface 161 of FIG. 1, the die-to-die connectors of FIG. 2, or a combination thereof) and locally stores another portion (e.g., remaining half for two-die configuration) of the write data bits at the master die. The master die 402 can send a portion of the write data bits, aligned with the WCK clock 428, to the array band logic 406a via a master-local data bus 420a. The master die 402 can send an internal write command 414a to the array/bank logic 406a to complete the local write operation and locally store the a targeted portion of the write data in the correct column location of the array/bank logic 406a. The master die 402 can use the WCK clock 428 aligned internal write command 414a to create the column select timing, the column redundancy match timing, and to create the signal that capture both the write address and write data bits in the array/bank logic 406a.

The master die 402 can store the column address 426 bits in a master FIFO 410a and wait for the write latency and write burst to complete. The master die 402 can generate the internal write command 414a using the WCK clock 428 in the master die DQ pads logic 416, which can be aligned with the write data bits in the data bus 420a. The internal write command 414a and write data bits in the master-local data bus 420a can be communicated from the DQ pad logic 416 to the array/bank logic 406a. The internal write command 414a and write data can be aligned by the WCK clock 428. The master die 402 can use the internal write command 414a to locally latch with the write data bits into the array/bank logic 406a with aligned timing. The master die 402 can release the stored write address bits, via the column address bus 408a, from the FIFO 410a so as to align the arrival of the write command 414a, the column address bits, and the write data bits at the array/bank logic 406a using the WCK clock 428. The master die 402 can use the write command with the WCK clock 428 timing to create the column redundancy signals and column select signals. The array/bank logic 406a can control column select timing, redundancy timing, latch address bits, and latch data bits.

The slave die 404 can send write data bits, aligned with the WCK clock 428, to the array band logic 406b via slave-local data bus 420b. The slave die 404 can send the write command 414b to the array/bank logic 406b to complete the write operation. The slave die 404 can locally store a corresponding portion of the write data in the correct column location of the array in the slave die 404. The slave die 404 can use the WCK clock 428 aligned write command 414b to create the column select timing, the column redundancy match timing, and to generate the signal that captures both the write address and write data bits in the array/bank logic 406b.

The slave die 404 can store the column address 426 bits in a slave FIFO 410b and wait for the write latency and write burst to complete. The slave die 404 can include local logic/circuitry configured to generate a slave-local write command 414b according to the internal write command communicated via the die-internal bus 422 and the corresponding the WCK clock 428. The slave die can use the slave-local write command 414 to align the corresponding portion of the write data bits in the data bus 420a with the command timing. The slave die 404 can receive the corresponding portion of the write data bits at linked data pads 418b via the inter-die data bus 422 and the linked data pads 418a. The slave-local write command 414b and write data bits in the slave-local data bus 420b can travel from the linked data pads 418b to the array/bank logic 406b. The slave-local write command 414b and write data bits can be aligned by the WCK clock 428 via the internal write command communicated over the inter-die data bus 422. The slave die 404 can use the write command 414b (e.g., instead of relying on the CA clock alone) to latch with the write data bits into the array/bank logic 406b with aligned timing. The slave die 404 can release the stored write address bits, via the column address bus 408b, from the slave FIFO 410b so as to align the arrival of the write command 414b, the column address bits 426, and the write data bits at the array/bank logic 406b. The slave die 404 can use the write command with the WCK clock 428 timing to create the column redundancy signals and column select signals. The array/bank logic 406b can control column select timing, redundancy timing, latch address bits, and latch data bits. By using the data clock (e.g., WCK clock 428) derived signal as described above, the apparatus can ensure that all the required bank logic and array signals are aligned without a need for separately matching the CA clock and data clock paths.

Figure 5:
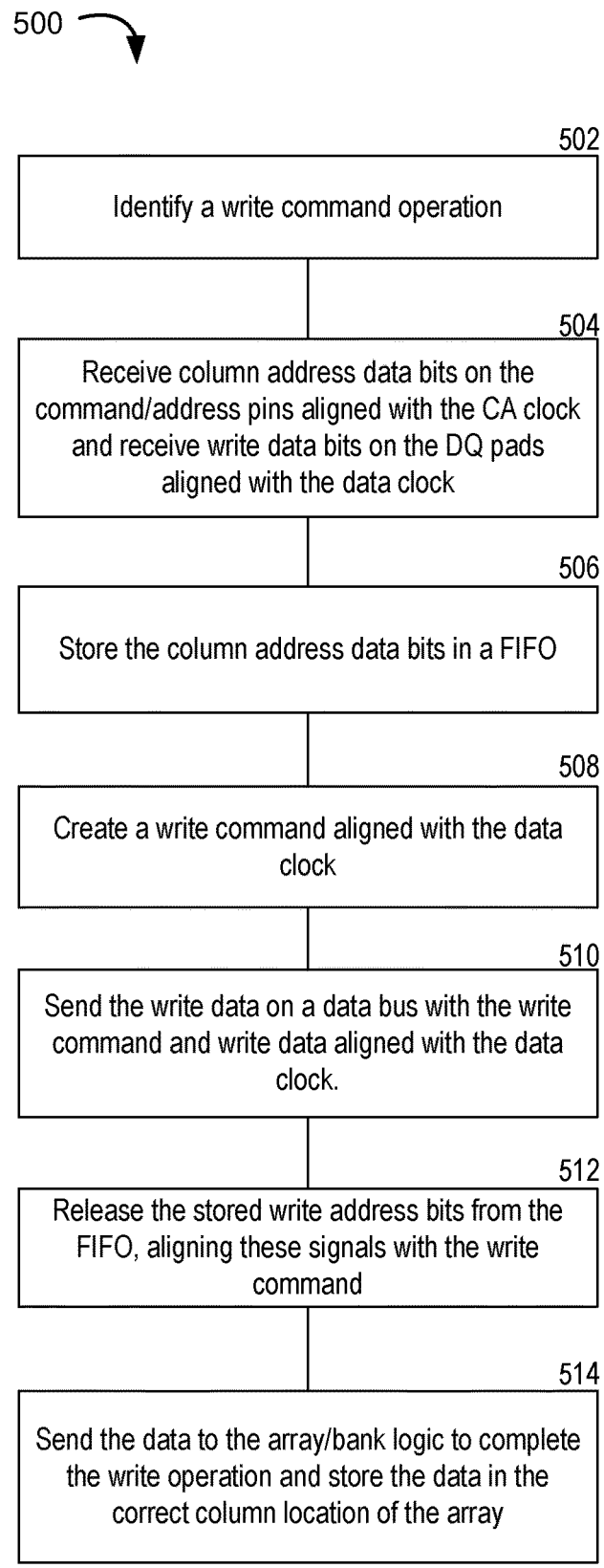
FIG. 5 is a flow diagram illustrating an example method of operating an apparatus in accordance with an embodiment of the present technology.

FIG. 5 is a flow diagram illustrating an example method 500 of operating an apparatus (e.g., the apparatus 100 of FIG. 1, the die stack 200 of FIG. 2, and/or the circuit 400 of FIG. 4) in accordance with an embodiment of the present technology. The apparatus can include a die grouping (e.g., the die grouping 200 of FIG. 2) that includes a master die (e.g., the master die 402 of FIG. 4) and one or more slave dies (e.g., the slave die 404 of FIG. 4). At block 502, the apparatus can identify a write command operation by receiving a write command from a memory controller and/or a host.

At block 504, the apparatus can receive column address data bits on the command address pins. The received bits can be aligned with the CA clock. The apparatus can further receive (e.g., at the master die) write data bits on the DQ pads. The received write data bits can be aligned with the data clock. At block 506, the apparatus can store the column address data bits in a local/master FIFO until the column address data bits are retrieved. At block 508, the apparatus can generate (e.g., at the master die) an internal write command according to the data clock in the master die DQ pads, thereby aligning/synchronizing the internal write command with the write data bits according to the data clock. The internal write command can be communicated from the master die to the slave die via the inter-die bus.

At block 510, the apparatus can send the write data bits, aligned with the data clock, from the DQ pads to the array/bank logic using one or more data bus. For example, the master die can send (1) a first portion of the write data bits to the local array via the master-local data bus and (2) a second portion of the write data bits to the slave die via the inter-die bus. The apparatus can latch the aligned write data and write command into the local array logic with aligned timing provided by the internal write command. At block 512, the apparatus can release the stored write address bits from the local FIFO at a time (e.g., a timing for the internal command instead of or in addition to the C/A clock) to align the write address bits with the write command and write data bits. By releasing the write address bits from the FIFO to align with the write command and the write data, the apparatus can align the arrival of the write data, the write command, and the write address bits at the local array/bank logic. At block 514, the apparatus can send the data to the array/bank logic to complete the write operation and store the data in the correct column location of the array.

Figure 6:
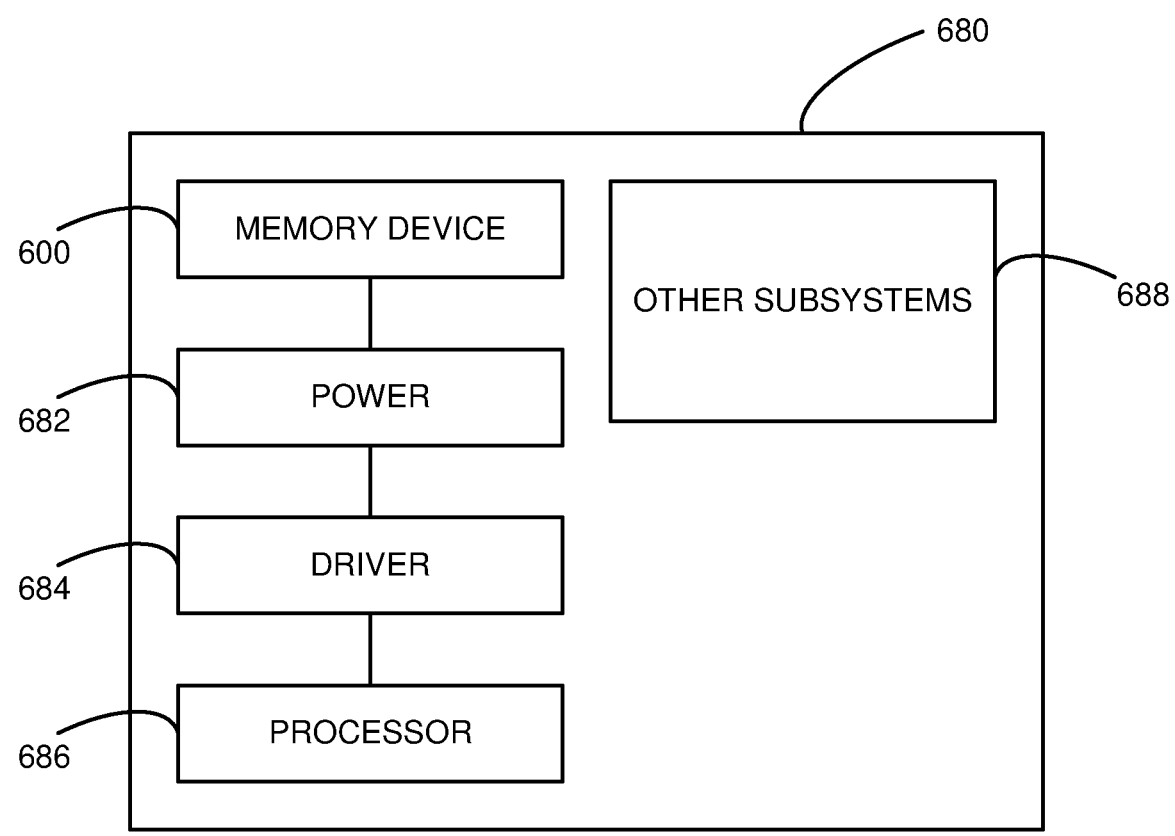
FIG. 6 is a schematic view of a system that includes an apparatus in accordance with an embodiment of the present technology.

FIG. 6 is a schematic view of a system that includes an apparatus in accordance with embodiments of the present technology. Any one of the foregoing apparatuses (e.g., memory devices) described above with reference to FIGS. 1-5 can be incorporated into any of a myriad of larger and/or more complex systems, a representative example of which is system 680 shown schematically in FIG. 6. The system 680 can include a memory device 600, a power source 682, a driver 684, a processor 686, and/or other subsystems or components 688. The memory device 600 can include features generally similar to those of the apparatus described above with reference to FIGS. 1-5, and can therefore include various features for performing a direct read request from a host device. The resulting system 680 can perform any of a wide variety of functions, such as memory storage, data processing, and/or other suitable functions. Accordingly, representative systems 680 can include, without limitation, hand-held devices (e.g., mobile phones, tablets, digital readers, and digital audio players), computers, vehicles, appliances and other products. Components of the system 680 may be housed in a single unit or distributed over multiple, interconnected units (e.g., through a communications network). The components of the system 680 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

In the illustrated embodiments above, the apparatuses have been described in the context of DRAM devices.

Apparatuses configured in accordance with other embodiments of the present technology, however, can include other types of suitable storage media in addition to or in lieu of DRAM devices, such as, devices incorporating NAND-based or NOR-based non-volatile storage media (e.g., NAND flash), magnetic storage media, phase-change storage media, ferroelectric storage media, etc.

The term "processing" as used herein includes manipulating signals and data, such as writing or programming, reading, erasing, refreshing, adjusting or changing values, calculating results, executing instructions, assembling, transferring, and/or manipulating data structures. The term data structure includes information arranged as bits, words or code-words, blocks, files, input data, system-generated data, such as calculated or generated data, and program data. Further, the term "dynamic" as used herein describes processes, functions, actions or implementation occurring during operation, usage or deployment of a corresponding device, system or embodiment, and after or while running manufacturer's or third-party firmware. The dynamically occurring processes, functions, actions or implementations can occur after or subsequent to design, manufacture, and initial testing, setup or configuration.

The above embodiments are described in sufficient detail to enable those skilled in the art to make and use the embodiments. A person skilled in the relevant art, however, will understand that the technology may have additional embodiments and that the technology may be practiced without several of the details of the embodiments described above with reference to FIGS. 1-6.

What is claimed is:

1. An apparatus, comprising:
a master die configured to communicate with a device external to the apparatus;
at least one slave die electrically coupled to the master die and configured to communicate with the master die using an inter-die bus;
wherein the master die is configured to:
receive column address data on one or more command address pins aligned with a command address clock;
store the column address data in a master die First-In First-Out (FIFO) buffer;
receive write data on one or more DQ pads aligned with a data clock;
create an internal write command aligned with the data clock;
latch the write data and the column address data at a memory array according to the internal write command instead of a command-address clock;
release the column address data from the master die FIFO buffer based on the internal write command for temporally aligning the column address data with the data clock within the master die;
send a first portion of the write data and the internal write command to a memory array of the master die;
send a second portion of the write data and the internal write command to the at least one slave die using the inter-die bus;
wherein the at least one slave die is configured to locally store the second portion using the internal write command to leverage the data clock in synchronizing the internal write command as a trigger for a local write operation and an availability of the corresponding second portion of the write data.

2. The apparatus of claim 1, wherein the at least one slave die is further configured to:
receive the second portion of the write data aligned with the data clock from the inter-die bus and one or more linked data pads of the master die.

3. The apparatus of claim 1, wherein the at least one slave die is further configured to:
store a portion of the column address data in a slave die FIFO buffer; and
release the stored portion of the column address data from the slave die FIFO buffer based on the internal write command for temporally aligning the column address data with the data clock within the at least one slave die.

4. The apparatus of claim 1, wherein the at least one slave die is further configured to:
send a portion of the write data according to the internal write command internally from one or more linked data pads to a slave memory array of the at least one slave die, wherein the portion of the write data and the write command are both temporally aligned with the data clock.

5. The apparatus of claim 1, wherein the apparatus comprises a Dynamic Random-Access Memory (DRAM) device, wherein the master die and slave each include local memory arrays and local access circuits that are configured to contemporaneously store and/or access different portions of the write data.

6. A semiconductor memory device, comprising:
at least one slave die electrically coupled to a master die and configured to communicate with the master die using an inter-die bus, wherein the at least one slave die includes:
a slave memory array configured to store data locally on the at least one slave die;
the master die configured to communicate with a device external to the semiconductor memory device, the master die including:
a master memory array configured to store data locally on the master die;
the master die configured to:
receive column address data on one or more command address pins aligned with a command address clock;
receive write data on one or more DQ pads aligned with a data clock;
create an internal write command aligned with the data clock;
send a first portion of the write data and the internal write command to a memory array of the master die;
send a second portion of the write data and the internal write command to the at least one slave die using the inter-die bus;
wherein the at least one slave die is configured to:
store a portion of the column address data in a slave die FIFO buffer;
locally store the second portion using the internal write command to leverage the data clock in synchronizing the internal write command as a trigger for a local write operation and an availability of the corresponding second portion of the write data; and
release the stored portion of the column address data from the slave die FIFO buffer based on the internal write command for temporally aligning the column address data with the data clock within the at least one slave die.

7. The semiconductor memory device of claim 6, wherein the master die is further configured to:

store the column address data in a master die First-In First-Out (FIFO) buffer; and release the column address data from the master die FIFO buffer based on the internal write command for temporally aligning the column address data with the data clock within the master die.

8. The semiconductor memory device of claim 7, wherein the master die is further configured to:

latch the write data and the column address data at the memory array according to the internal write command instead of a command-address clock.

9. The semiconductor memory device of claim 6, wherein the at least one slave die is further configured to:

receive the second portion of the write data aligned with the data clock from the inter-die bus and one or more linked data pads of the master die.

10. The semiconductor memory device of claim 6, wherein the at least one slave die is further configured to:

send a portion of the write data according to the internal write command internally from one or more linked data pads to a slave memory array of the at least one slave die, wherein the portion of the write data and the write command are both temporally aligned with the data clock.

11. The semiconductor memory device of claim 6, wherein the semiconductor memory device comprises a Dynamic Random-Access Memory (DRAM) device, wherein the master die and slave each include local memory arrays and local access circuits that are configured to contemporaneously store and/or access different portions of the write data.

* * * * *